(12) United States Patent
Takizawa et al.

(10) Patent No.: US 11,106,062 B2
(45) Date of Patent: Aug. 31, 2021

(54) LIGHT MODULATOR, OPTICAL OBSERVATION DEVICE AND OPTICAL IRRADIATION DEVICE

(71) Applicant: HAMAMATSU PHOTONICS K.K., Hamamatsu (JP)

(72) Inventors: Kuniharu Takizawa, Hamamatsu (JP); Hiroshi Tanaka, Hamamatsu (JP); Haruyoshi Toyoda, Hamamatsu (JP); Yasushi Ohbayashi, Hamamatsu (JP); Hiroto Sakai, Hamamatsu (JP)

(73) Assignee: HAMAMATSU PHOTONICS K.K., Hamamatsu (JP)

(*) Notice: Subject to any disclaimer, the term of this patent is extended or adjusted under 35 U.S.C. 154(b) by 48 days.

(21) Appl. No.: 16/307,517

(22) PCT Filed: Jun. 5, 2017

(86) PCT No.: PCT/JP2017/020870
§ 371 (c)(1),
(2) Date: Dec. 6, 2018

(87) PCT Pub. No.: WO2017/213099
PCT Pub. Date: Dec. 14, 2017

(65) Prior Publication Data
US 2019/0302492 A1    Oct. 3, 2019

(30) Foreign Application Priority Data
Jun. 6, 2016  (JP) .............................. JP2016-112852

(51) Int. Cl.
*G06F 1/03* (2006.01)
*G02F 1/03* (2006.01)
(Continued)

(52) U.S. Cl.
CPC ........... *G02F 1/0316* (2013.01); *G01N 21/17* (2013.01); *G01N 21/64* (2013.01);
(Continued)

(58) Field of Classification Search
CPC .... G01N 21/17; G01N 21/64; G01N 21/6458; G02B 21/06; G02B 21/16; G02F 1/03; G02F 1/0311; G02F 1/0327
See application file for complete search history.

(56) References Cited

U.S. PATENT DOCUMENTS 3,938,878 A * 2/1976 Fox ........................... G02F 1/03
                                                    359/251
5,221,989 A   6/1993 Stappaerts et al.
(Continued)

FOREIGN PATENT DOCUMENTS

CN        1825579 A     8/2006
CN      101281301 A    10/2008
(Continued)

OTHER PUBLICATIONS

Translated JP-2006065037-A (Year: 2006).*
(Continued)

*Primary Examiner* — David P Porta
*Assistant Examiner* — Mamadou Faye
(74) *Attorney, Agent, or Firm* — Faegre Drinker Biddle & Reath LLP

(57) ABSTRACT

A light modulator includes a perovskite-type electro-optic crystal including a first surface to which the input light is input and a second surface which faces the first surface; a first electrode which is disposed on the first surface of the electro-optic crystal and through which the input light is transmitted; a second electrode which is disposed on the second surface of the electro-optic crystal and through which the input light is transmitted; and a drive circuit for
(Continued)

applying an electric field between the first electrode and the second electrode. The first electrode is disposed alone on the first surface. The second electrode is disposed alone on the second surface. At least one of the first electrode and the second electrode partially covers the first surface or the second surface. A propagation direction of the input light and an applying direction of the electric field are parallel to each other.

30 Claims, 12 Drawing Sheets

(51) Int. Cl.
  *G01N 21/64*   (2006.01)
  *G02B 21/06*   (2006.01)
  *G02B 21/16*   (2006.01)
  *G01N 21/17*   (2006.01)

(52) U.S. Cl.
  CPC ......... *G01N 21/6458* (2013.01); *G02B 21/06* (2013.01); *G02B 21/16* (2013.01); *G02F 1/03* (2013.01); *G02F 1/0311* (2013.01); *G02F 1/0327* (2013.01)

(56) References Cited

U.S. PATENT DOCUMENTS

| | | | |
|---|---|---|---|
| 5,291,314 | A | 3/1994 | Agranat et al. |
| 5,497,258 | A | 3/1996 | Ju et al. |
| 6,211,991 | B1 | 4/2001 | Bryan |
| 6,525,867 | B1 | 2/2003 | Oakley et al. |
| 6,950,584 | B1 * | 9/2005 | Suzuki ................ B82Y 20/00 385/11 |
| 2003/0197273 | A1 | 10/2003 | Dennison et al. |
| 2005/0152024 | A1 * | 7/2005 | Awaya .................. G02F 1/05 359/321 |
| 2006/0070715 | A1 * | 4/2006 | Connors, Jr. .......... B29C 39/26 164/1 |
| 2010/0001371 | A1 | 1/2010 | Suzuki et al. |
| 2010/0166464 | A1 | 7/2010 | Cho |
| 2010/0244632 | A1 * | 9/2010 | Maekawa .......... G01C 19/5607 310/360 |
| 2011/0170160 | A1 * | 7/2011 | Park ..................... G02F 1/03 359/245 |
| 2011/0255148 | A1 | 10/2011 | Ohta et al. |
| 2013/0057953 | A1 | 3/2013 | Yokoi |
| 2018/0276843 | A1 * | 9/2018 | Send ................. A63F 13/213 |

FOREIGN PATENT DOCUMENTS

| | | | |
|---|---|---|---|
| CN | 101316790 | A | 12/2008 |
| CN | 102096206 | A | 6/2011 |
| CN | 103605217 | A | 2/2014 |
| CN | 105527733 | A | 4/2016 |
| JP | S53-3841 | A | 1/1978 |
| JP | S63-038916 | A | 2/1988 |
| JP | H05-224165 | A | 9/1993 |
| JP | H09-502813 | A | 3/1997 |
| JP | 2005-234541 | A | 9/2005 |
| JP | 2006-65037 | A | 3/2006 |
| JP | 2006065037 | A * | 3/2006 |
| JP | 2010-19630 | A | 1/2010 |
| JP | 2010-224003 | A | 10/2010 |
| JP | 2014-89340 | A | 5/2014 |
| JP | 2014-89341 | A | 5/2014 |
| JP | 2014-202786 | A | 10/2014 |
| JP | 2014-219495 | A | 11/2014 |
| JP | 2015-158531 | A | 9/2015 |
| WO | WO-95/06272 | A1 | 3/1995 |
| WO | WO 2006/007071 | A1 | 1/2006 |

OTHER PUBLICATIONS

International Preliminary Report on Patentability dated Dec. 20, 2018 for PCT/JP2017/020871.
International Preliminary Report on Patentability dated Dec. 20, 2018 for PCT/JP2017/020873.
International Preliminary Report on Patentability dated Dec. 20, 2018 for PCT/JP2017/020869.
International Preliminary Report on Patentability dated Dec. 20, 2018 for PCT/JP2017/020870.
U.S. Office Action dated Dec. 21, 2020 issued in U.S. Appl. No. 16/307,511, including double-patenting rejection based on U.S. Appl. No. 16/769,321 and U.S. Appl. No. 16/769,327.
Notification of First Office Action dated Dec. 23, 2020 in Chinese Patent Application No. 201780029529.8 (7 pages) with an English translation (3 pages).

* cited by examiner

Fig.3
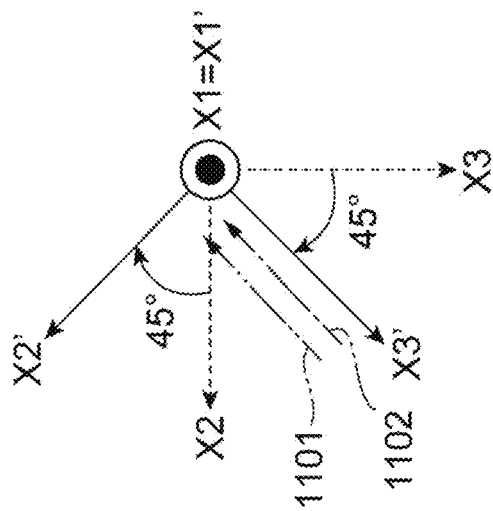
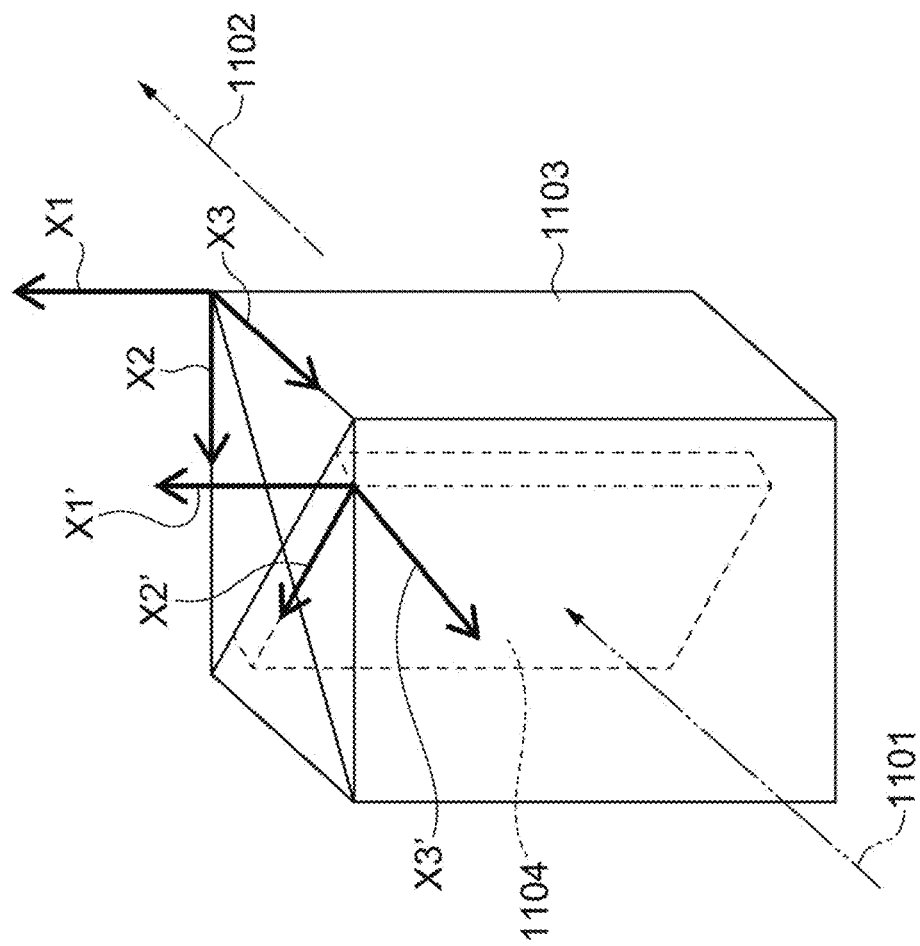

LIGHT MODULATOR, OPTICAL OBSERVATION DEVICE AND OPTICAL IRRADIATION DEVICE

TECHNICAL FIELD

The present disclosure relates to a light modulator, an optical observation device, and an optical irradiation device.

BACKGROUND ART

For example, Patent Literature 1 and Patent Literature 2 disclose electro-optical elements. These electro-optical elements include a substrate, a KTN ($KTa_{1-x}Nb_xO_3$) layer that is constituted of a ferroelectric substance laminated on the substrate, a transparent electrode that is disposed on a front surface of the KTN layer, and a metal electrode that is disposed on a rear surface of the KTN layer. KTN adopts four crystal structures depending on the temperature and is utilized as an electro-optical element when having a perovskite-type crystal structure. Such a KTN layer is formed on a seed layer which is formed on a metal electrode.

CITATION LIST

Patent Literature

[Patent Literature 1] Japanese Unexamined Patent Publication No. 2014-89340
[Patent Literature 2] Japanese Unexamined Patent Publication No. 2014-89341

SUMMARY OF INVENTION

Technical Problem

In an electro-optical element described above, a KTN layer is configured to be interposed between a pair of electrodes. In addition, the pair of electrodes is formed over a front surface and a rear surface of the KTN layer in their entirety. Therefore, an converse piezoelectric effect or an electrostrictive effect increases when an electric field is applied to the KTN layer, so that there is concern that stable light modulation may not be able to be performed.

An object of the present disclosure is to provide a light modulator, an optical observation device, and an optical irradiation device, in which an converse piezoelectric effect or an electrostrictive effect is prevented and stable light modulation is performed.

Solution to Problem

According to an aspect, there is provided a light modulator for modulating input light and outputting modulated light that has been subjected to modulation. The light modulator includes a perovskite-type electro-optic crystal having a relative permittivity of 1,000 or higher and including a first surface to which the input light is input and a second surface which faces the first surface; a first optical element including a first electrode which is disposed on the first surface of the electro-optic crystal and through which the input light is transmitted; a second optical element including a second electrode which is disposed on the second surface of the electro-optic crystal and through which the input light is transmitted; and a drive circuit for applying an electric field between the first electrode and the second electrode. The first electrode is disposed alone on the first surface. The second electrode is disposed alone on the second surface. At least one of the first electrode and the second electrode partially covers the first surface or the second surface. A propagation direction of the input light and an applying direction of the electric field are parallel to each other in the electro-optic crystal.

According to another aspect, there is provided a light modulator for modulating input light and outputting modulated light that has been subjected to modulation. The light modulator includes a perovskite-type electro-optic crystal having a relative permittivity of 1,000 or higher and including a first surface to which the input light is input and a second surface which faces the first surface; a first optical element including a first electrode which is disposed on the first surface of the electro-optic crystal and through which the input light is transmitted; a second optical element including a second electrode which is disposed on the second surface of the electro-optic crystal and reflects the input light toward the first surface; and a drive circuit for applying an electric field between the first electrode and the second electrode. The first electrode is disposed alone on the first surface. The second electrode is disposed alone on the second surface. At least one of the first electrode and the second electrode partially covers the first surface or the second surface. A propagation direction of the input light and an applying direction of the electric field are parallel to each other in the electro-optic crystal.

In addition, according to another aspect, there is provided an optical observation device including a light source for outputting the input light, the light modulator described above, an optical system for irradiating a target with modulated light output from the light modulator, and a light detector for detecting light output from the target.

In addition, according to another aspect, there is provided an optical irradiation device including a light source for outputting the input light, the light modulator described above, and an optical system for irradiating a target with modulated light output from the light modulator.

According to the light modulator, the optical observation device, and the optical irradiation device described above, input light is transmitted through the first electrode of the first optical element and is input to an input surface of the perovskite-type electro-optic crystal. This input light can be output after being transmitted through the second optical element disposed on a rear surface of the electro-optic crystal or can be output after being reflected by the second optical element. In this case, an electric field is applied to a part between the first electrode provided in the first optical element and the second electrode provided in the second optical element. Accordingly, an electric field is applied to the electro-optic crystal having a high relative permittivity, so that input light is modulated. In this light modulator, the first electrode and the second electrode are disposed one each, and at least one of the first electrode and the second electrode partially covers the first surface or the second surface. In this case, an converse piezoelectric effect or an electrostrictive effect is manifested in a part in which the first electrode and the second electrode face each other, but the converse piezoelectric effect or the electrostrictive effect is not manifested around the part. Therefore, a portion around the part in which the first electrode and the second electrode face each other functions as a damper. Accordingly, compared to a case in which the first surface and the second surface are covered with electrodes in their entirety, the converse piezoelectric effect and the electrostrictive effect are prevented. Therefore, occurrence of resonance or the like is prevented, and stable light modulation is performed.

In addition, the aspect may further include a transparent substrate including a first surface which faces the second optical element and a second surface which is a surface on the opposite side of the first surface. The transparent substrate may output the input light transmitted through the second optical element. In addition, the aspect may further include a substrate including a first surface which faces the second optical element. In such light modulators, even if an electro-optic crystal is formed to have a small thickness in an optical axis direction, the electro-optic crystal is protected from an external shock or the like.

In addition, according to the aspect, when a thickness (m) of the electro-optic crystal in an electric field applying direction of the electro-optic crystal is d, an area ($m^2$) of at least one of the first electrode and the second electrode may be $25\ d^2$ or smaller. In such a light modulator, the converse piezoelectric effect or the electrostrictive effect is effectively reduced.

In addition, according to the aspect, the area of the first electrode may be larger or smaller than the area of the second electrode. In this case, positional alignment of the first electrode and the second electrode can be easily performed.

In addition, the aspect may further include a third electrode electrically connected to the first electrode, and a fourth electrode electrically connected to the second electrode. The third electrode and the fourth electrode may be disposed not to overlap each other with the electro-optic crystal interposed therebetween.

In addition, according to the aspect, the first optical element may include a third electrode electrically connected to the first electrode, and an insulating portion which disposed between the third electrode and the first surface and reduces an electric field generated in the third electrode. The drive circuit may apply an electric field to the first electrode with the third electrode interposed therebetween. Since the third electrode is provided for connection to the drive circuit, the size and the position of the first electrode can be freely designed. In this case, the insulating portion prevents the electric field which is generated in the third electrode and affects the electro-optic crystal.

In addition, according to the aspect, the first optical element may have a light reducing portion which covers the first surface around the first electrode and reduces light input to the first surface from a portion around the first electrode. In this case, the light reducing portion may be a reflecting layer which reflects the light. In addition, the light reducing portion may be an absorbing layer which absorbs the light. In addition, the light reducing portion may be a blocking layer which blocks the light. Accordingly, light input from a part in which the first electrode is not formed on the first surface is prevented.

In addition, according to the aspect, a dielectric multilayer reflecting the input light may be provided in the second electrode. According to this configuration, input light is efficiently reflected.

In addition, according to the aspect, the second electrode may reflect the input light. According to this configuration, there is no need to separately provide a reflecting layer or the like on the second electrode side.

In addition, according to the aspect, the electro-optic crystal may be a crystal of $KTa_{1-x}Nb_xO_3$ ($0 \leq x \leq 1$), a crystal of $K_{1-y}Li_yTa_{1-x}Nb_xO_3$ ($0 \leq x \leq 1$ and $0 < y < 1$), or a PLZT crystal. According to this configuration, an electro-optic crystal having a high relative permittivity can be easily realized.

In addition, the aspect may further include a temperature control element for controlling the temperature of the electro-optic crystal. According to this configuration, the modulation accuracy is more stable due to a uniformly maintained temperature for the electro-optic crystal.

Effects of Invention

According to the light modulator, the optical observation device, and the optical irradiation device of the embodiments, the converse piezoelectric effect or the electrostrictive effect is prevented and stable light modulation is performed.

BRIEF DESCRIPTION OF DRAWINGS

FIG. 3 is a view illustrating a relationship among crystal axes, a traveling direction of light, and an electric field in retardation modulation.

DESCRIPTION OF EMBODIMENTS

Hereinafter, embodiments will be described in detail with reference to the drawings. For convenience, there are cases in which the same reference signs are applied to substantially the same elements and description thereof is omitted.

First Embodiment

Figure 1:
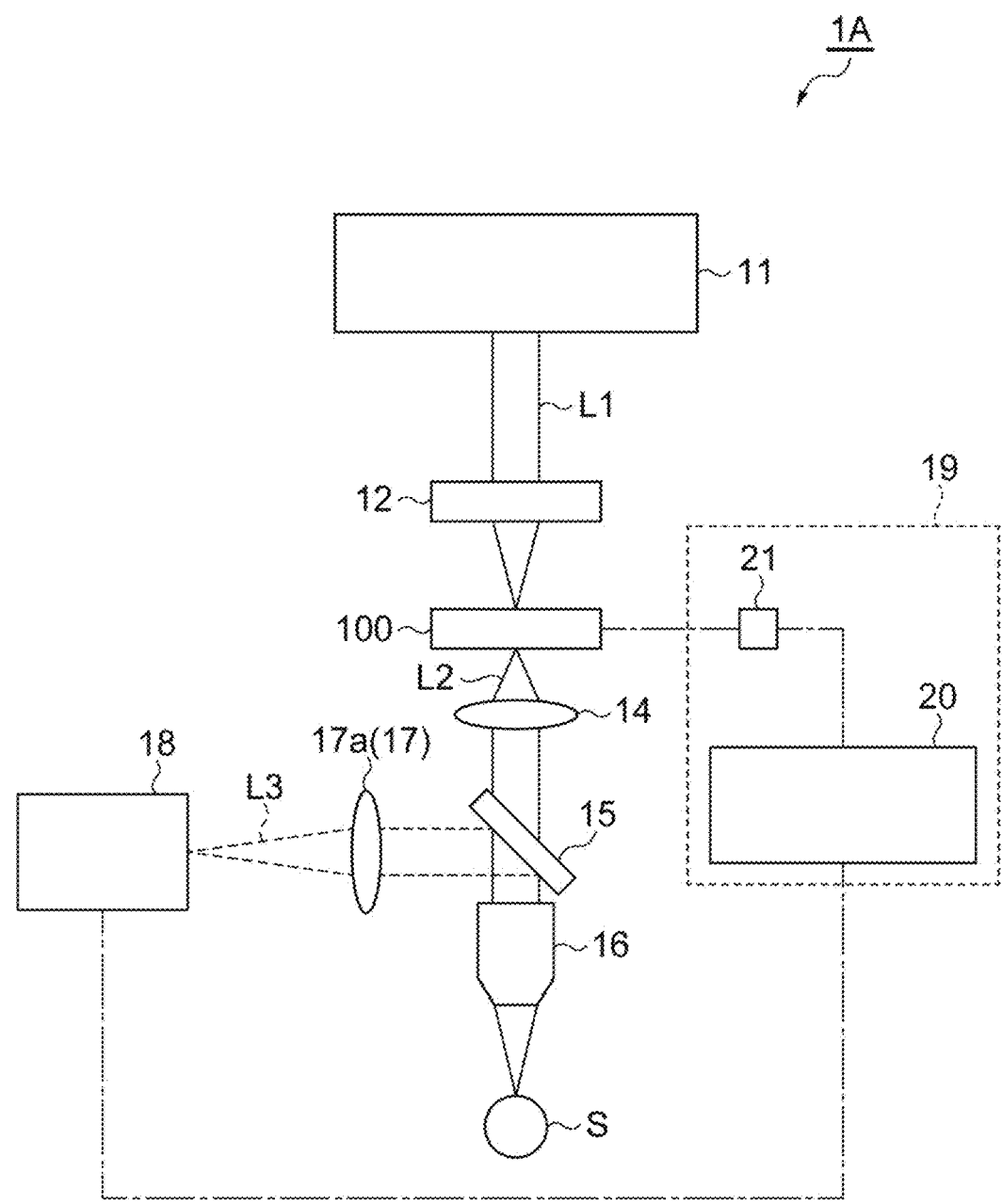
FIG. 1 is a block diagram illustrating a configuration of an optical observation device according to an embodiment.

FIG. 1 is a block diagram illustrating a configuration of an optical observation device according to an embodiment. For example, an optical observation device 1A is a fluorescence microscope for capturing an image of an observation target. The optical observation device 1A irradiates a surface of a specimen (target) S with input light L1 and captures an image of detection light L3 such as fluorescence or reflected light output from the specimen S in response to the irradiation, thereby acquiring an image of the specimen S.

For example, the specimen S, which becomes an observation target, is a sample such as a cell or an organism containing a fluorescent material such as a fluorescent pigment or fluorescent protein. In addition, the specimen S may be a sample such as a semiconductor device or a film. When the specimen S is irradiated with light having a predetermined wavelength region (excitation light or illumination light), the specimen S emits the detection light L3 such as fluorescence, for example. For example, the specimen S is accommodated inside a holder having transparency with respect to at least the input light L1 and the detection light L3. For example, this holder is held on a stage.

As illustrated in FIG. 1, the optical observation device 1A includes a light source 11, a condensing lens 12, a light modulator 100, a first optical system 14, a beam splitter 15, an object lens 16, a second optical system 17, a light detector 18, and a control unit 19.

The light source 11 outputs the input light L1 having a wavelength at which the specimen S is excited. For example, the light source 11 emits coherent light or incoherent light. Examples of a coherent light source include a laser light source such as a laser diode (LD). Examples of an incoherent light source include a light emitting diode (LED), a super-luminescent diode, (SLD) and a lamp-based light source.

The condensing lens 12 concentrates the input light L1 output from the light source 11 and outputs the concentrated input light L1. The light modulator 100 is disposed such that a propagation direction of the input light L1 and a direction of an applied electric field are parallel to each other. Therefore, in the light modulator 100, the propagation direction of the input light L1 and the applying direction of an electric field in an electro-optic crystal 101 are parallel to each other. The light modulator 100 is a light modulator which modulates the phase or retardation (phase difference) of the input light L1 output from the light source 11. The light modulator 100 modulates the input light L1 input from the condensing lens 12 and outputs modulated light L2 that has been subjected to modulation toward the first optical system 14. The light modulator 100 according to the present embodiment is constituted as a transmission-type light modulator. However, in the optical observation device 1A, a reflective light modulator may be used. The light modulator 100 is electrically connected to a controller 21 of the control unit 19 and constitutes a light modulator unit. Driving of the light modulator 100 is controlled by the controller 21 of the control unit 19. The light modulator 100 will be described below in detail.

The first optical system 14 optically couples the light modulator 100 and the object lens 16 to each other. Accordingly, the modulated light L2 output from the light modulator 100 is guided to the object lens 16. For example, the first optical system 14 concentrates the modulated light L2 from the light modulator 100 by a pupil of the object lens 16.

The beam splitter 15 is an optical element for separating the modulated light L2 and the detection light L3 from each other. For example, the beam splitter 15 allows the modulated light L2 having an excitation wavelength to be transmitted through and reflects the detection light L3 having a fluorescence wavelength. In addition, the beam splitter 15 may be a polarization beam splitter or a dichroic mirror. Depending on the optical systems on the front and rear sides (for example, the first optical system 14 and the second optical system 17) of the beam splitter 15 or the type of the microscope to be applied, the beam splitter 15 may reflect the modulated light L2 and allow the detection light L3 having a fluorescence wavelength to be transmitted through.

The object lens 16 concentrates the modulated light L2 that has been subjected to modulation by the light modulator 100, irradiates the specimen S with the concentrated light, and guides the detection light L3 emitted from the specimen S in response to the irradiation. For example, the object lens 16 is configured to be movable along an optical axis by a drive element such as a piezoelectric actuator or a stepping motor. Accordingly, a concentration position of the modulated light L2 and a focal position for detecting the detection light L3 can be adjusted.

The second optical system 17 optically couples the object lens 16 and the light detector 18 to each other. Accordingly, the light detector 18 forms an image of the detection light L3 guided from the object lens 16. The second optical system 17 has a lens 17a which forms an image of the detection light L3 from the object lens 16 on a light receiving surface of the light detector 18.

The light detector 18 captures an image of the detection light L3 which has been guided by the object lens 16 and formed on the light receiving surface as an image. For example, the light detector 18 is an area image sensor such as a CCD image sensor or a CMOS image sensor.

The control unit 19 includes a computer 20 having a control circuit (processor), an image processing circuit (processor), a memory, and the like; and the controller 21 having a control circuit (processor), a memory, and the like and being electrically connected to the light modulator 100 and the computer 20. For example, the computer 20 is a personal computer, a smart device, a microcomputer, a cloud server, or the like. The computer 20 causes the processor to control operations of the object lens 16, the light detector 18, and the like and executes various types of control. In addition, the controller 21 controls the phase modulation amount or the retardation modulation amount in the light modulator 100.

Figure 2:
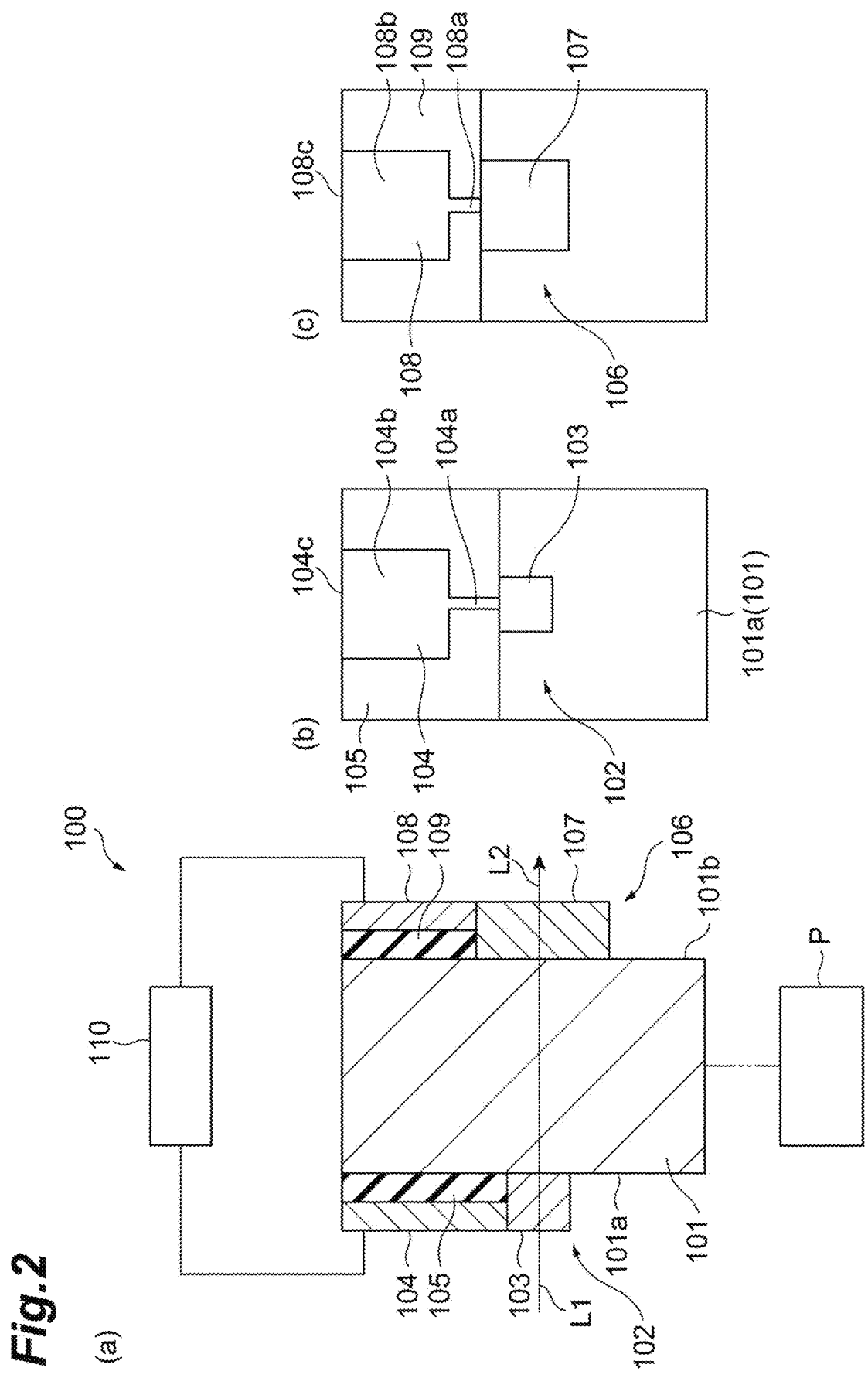
FIG. 2 is a view schematically illustrating a light modulator according to a first embodiment.

Next, the light modulator 100 will be described in detail. FIG. 2 is a view schematically illustrating a light modulator. The light modulator 100 is a transmission-type light modulator which modulates the input light L1 and outputs the modulated light L2 that has been subjected to modulation. As illustrated in FIG. 2, the light modulator 100 includes the electro-optic crystal 101, a light input unit (first optical element) 102, a light output unit (second optical element) 106, and a drive circuit 110. In FIG. 2(a), the electro-optic crystal 101, the light input unit 102, and the light output unit 106 of the light modulator 100 are illustrated in a cross section. In addition, FIG. 2(b) is a view of the light modulator 100 seen from the light input unit 102 side, and FIG. 2(c) is a view of the light modulator 100 seen from the light output unit 106 side.

Figure 4:
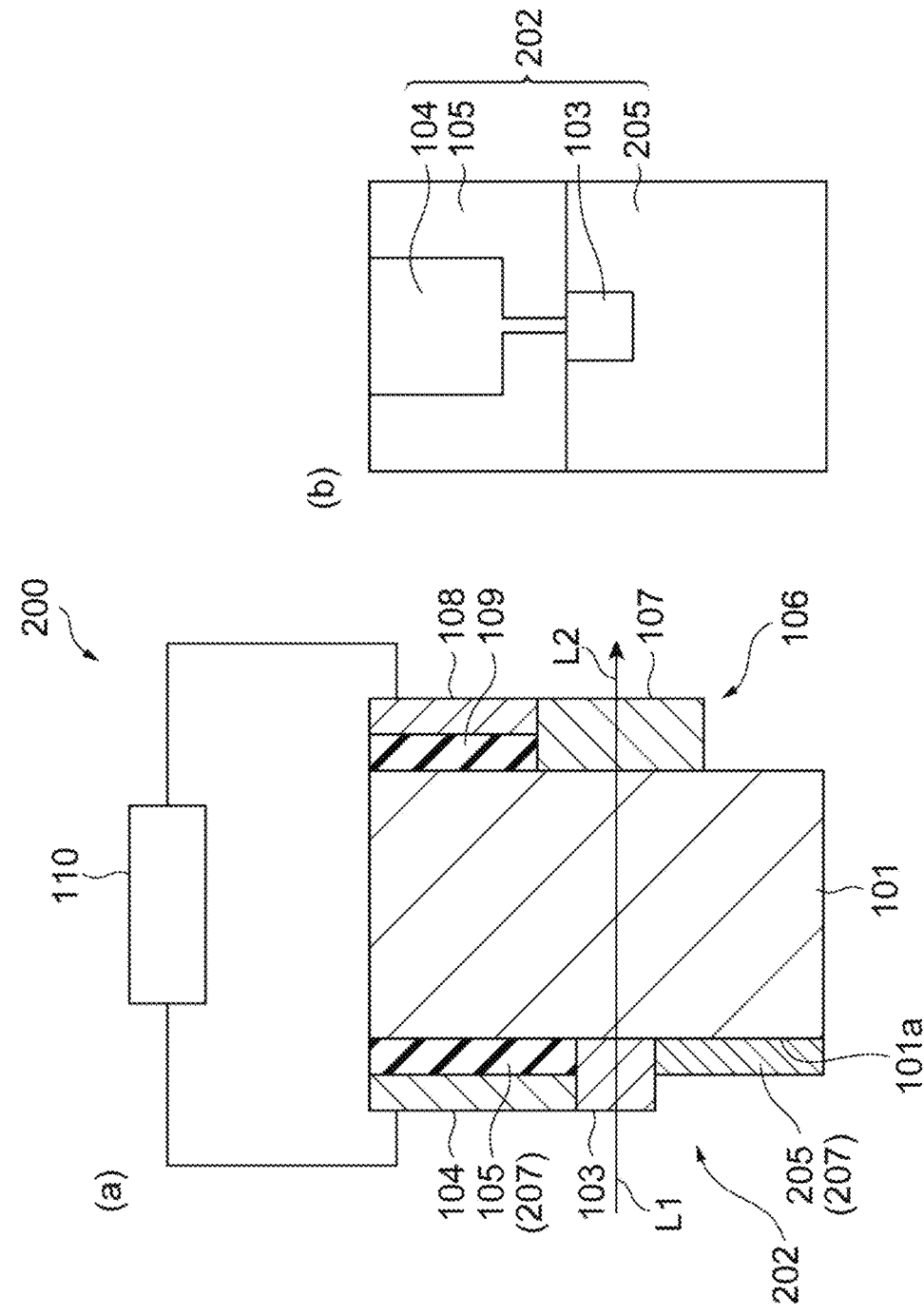
FIG. 4 is a view schematically illustrating a light modulator according to a second embodiment.

The electro-optic crystal 101 has a plate shape including an input surface (first surface) 101a to which the input light L1 is input, and a rear surface (second surface) 101b which faces the input surface 101a. The electro-optic crystal 101 has a perovskite-type crystal structure utilizing an electro-optical effect such as a Pockels effect and a Kerr effect for variation of the refractive index. The electro-optic crystal 101 having a perovskite-type crystal structure is an isotropic crystal which belongs to a point group m3m of a cubic system and has a relative permittivity of 1,000 or higher. For example, the relative permittivity of the electro-optic crystal 101 may have a value ranging from approximately 1,000 to 20,000. Examples of such an electro-optic crystal 101 include a crystal of $KTa_{1-x}Nb_xO_3$ ($0 \leq x \leq 1$) (will hereinafter be referred to as a "KTN crystal"), a crystal of $K_{1-y}Li_yTa_{1-x}Nb_xO_3$ ($0 \leq x \leq 11$ and $0 < y < 1$), and a PLZT crystal. Specifically, examples thereof include $BaTiO_3$, $K_3Pb_3(Zn_2Nb_7)O_{27}$, $K(Ta_{0.65}Nb_{0.35})P_3$, $Pb_3MgNb_2O_9$, and $Pb_3NiNb_2O_9$. In the light modulator 100 of the present embodiment, a KTN crystal is used as the electro-optic crystal 101. Since a KTN crystal is in the point group m3m of the cubic system, the KTN crystal has no Pockels effect and performs modulation due to the Kerr effect. Therefore, since light is input in a manner of being parallel or perpendicular to a crystal axis of the electro-optic crystal 101, phase modulation can be performed by applying an electric field in the same direction. In addition, retardation modulation can be performed by rotating two arbitrary crystal axes about the remaining axis at an arbitrary angle other than 0° and 90°. FIG. 3(a) is a perspective view illustrating a relationship among the crystal axes, a traveling direction of light, and an electric field in retardation modulation. FIG. 3(b) is a plan view illustrating each of the axes. The example in FIG. 3 illustrates a case in which a crystal is rotated at an angle of 45°. When axes X2 and X3 are rotated 45° about an axis X1 and new axes X1, X2', and X3' are set, retardation modulation can be performed by inputting light in a manner of being parallel or perpendicular to these new axes. In FIG. 4, an electric field is applied in an applying direction 1102 of a crystal 1104. A propagation direction 1101 of the input light L1 becomes parallel to the applying direction 1102 of the electric field. In this case, Kerr coefficients used for modulating the input light L1 are g11, g12, and g44.

The relative permittivity of a KTN crystal is likely affected by the temperature. For example, the relative permittivity is a maximum at approximately 20,000 at a temperature near −5° C., and the relative permittivity decreases to approximately 5,000 at a normal temperature close to 20° C. Therefore, for example, the temperature of the electro-optic crystal 101 is controlled such that it is a temperature near −5° C. by a temperature control element P such as a Peltier element.

As illustrated in FIG. 2(b), the light input unit 102 includes a transparent electrode (first electrode) 103, a connection electrode (third electrode) 104, and an insulating portion 105. The transparent electrode 103 is disposed on the input surface 101a of the electro-optic crystal 101. For example, the transparent electrode 103 is formed of ITO (indium tin oxide) and allows the input light L to be transmitted through. That is, the input light L is transmitted through the transparent electrode 103 and is input to the inside of the electro-optic crystal 101. In the present embodiment, the transparent electrode 103 has a rectangular shape in a plan view, for example, and partially covers the input surface 101a. In addition, when the thickness of the electro-optic crystal 101 in the electric field applying direction is d (μm), the area (μm$^2$) of the transparent electrode 103 may be 25 d$^2$ or smaller. The transparent electrode 103 is formed alone in a location substantially at the center on the input surface 101a and is separated from a peripheral edge of the input surface 101a. For example, such a transparent electrode 103 may be formed by depositing ITO on the input surface 101a of the electro-optic crystal 101 using a mask pattern.

The insulating portion 105 is formed on the input surface 101a. In the present embodiment, the insulating portion 105 is in contact with the transparent electrode 103 and is uniformly formed on the input surface 101a to an end edge on one side from the transparent electrode 103. For example, the height of an insulating portion is formed to be smaller than the height of the transparent electrode 103. For example, the insulating portion is an insulating film formed of an insulator such as SiO$_2$ (silicon dioxide) or HfO$_2$ (hafnium oxide). The connection electrode 104 is formed on the insulating portion 105. That is, the insulating portion 105 is disposed between the input surface 101a and the connection electrode 104. Accordingly, the insulating portion 105 has a thickness to an extent that most electric fields generated in the connection electrode 104 are applied to the insulating portion and an electric field applied to the electro-optic crystal 101 is disregarded.

The connection electrode 104 is electrically connected to the transparent electrode 103. The connection electrode 104 includes a lead portion 104a having a thin wire shape of which one end is electrically connected to the transparent electrode 103, and a main body portion 104b having a rectangular shape in a plan view electrically connected to the other end of the lead portion 104a. For example, the area of the main body portion 104b is larger than that of the transparent electrode 103. In addition, for example, the main body portion 104b extends to the peripheral edge of the input surface 101a. In the present embodiment, one side 104c of the main body portion 104b having a rectangular shape coincides with the peripheral edge of the input surface 101a of the electro-optic crystal 101. Similar to the transparent electrode 103, the connection electrode 104 may be formed of a transparent material such as ITO. In addition to a transparent material, the connection electrode 104 may be formed of a different conductive material which does not allow the input light L1 to be transmitted through. For example, the connection electrode 104 may be formed by depositing ITO on the insulating portion 105 using a mask pattern.

As illustrated in FIG. 2(c), the light output unit 106 includes a transparent electrode (second electrode) 107, a connection electrode (fourth electrode) 108, and an insulating portion 109. The transparent electrode 107 is disposed on the rear surface 101b of the electro-optic crystal 101. Similar to the transparent electrode 103, for example, the transparent electrode 107 is formed of ITO and allows the input light L1 to be transmitted through. That is, the input light L1 which has been input to the inside of the electro-optic crystal 101 and has been subjected to phase modulation or retardation modulation can be output from the transparent electrode 107 as the modulated light L2. In the present embodiment, the transparent electrode 107 has a rectangular shape in a plan view, for example, and partially covers the rear surface 101b. In addition, when the thickness of the electro-optic crystal 101 in the electric field applying direction is d (μm), the area (μm$^2$) of the transparent electrode 107 may be 25 d$^2$ or smaller. The transparent electrode 107 is formed alone in a location substantially at the center on the rear surface 101b and is separated from the peripheral edge on the rear surface 101b. In addition, in a plan view, the area of the transparent electrode 107 is formed to be larger than that of the transparent electrode 103. In addition, the center of the transparent electrode 107 and the center of the transparent electrode 103 substantially coincide with each other in an optical axis direction. Therefore, when seen in the optical axis direction, the transparent electrode 103 in its entirety is accommodated inside the transparent electrode 107.

The insulating portion 109 is formed on the rear surface 101b. In the present embodiment, the insulating portion 109 is in contact with the transparent electrode 107 and is uniformly formed on the rear surface 101b to the end edge on one side from the transparent electrode 107. For example, the height of the insulating portion is formed to be smaller than the height of the transparent electrode 107. For example, the insulating portion is an insulating film formed of an insulator such as SiO$_2$ or HfO$_2$. The connection electrode 108 is formed on the insulating portion 109. That is, the insulating portion 109 is disposed between the rear surface 101b and the connection electrode 108. Accordingly, the insulating portion 109 insulates the rear surface 101b from an electric field generated in the connection electrode 108.

The connection electrode 108 is electrically connected to the transparent electrode 107. The connection electrode 108 includes a lead portion 108a having a thin wire shape of which one end is electrically connected to the transparent electrode 107, and a main body portion 108b having a rectangular shape in a plan view electrically connected to the other end of the lead portion 108a. For example, the area of the main body portion 108b is larger than that of the transparent electrode 107. In addition, for example, the main body portion 108b extends to the peripheral edge on the rear surface 101b. In the present embodiment, one side 108c of the main body portion 108b having a rectangular shape coincides with the peripheral edge on the rear surface 101b of the electro-optic crystal 101. In addition, the one side 108c of the main body portion 108b does not have to coincide with a surrounding portion on the rear surface 101b of the electro-optic crystal 101. Similar to the transparent electrode 107, the connection electrode 108 may be formed of a transparent material such as ITO. In addition to a transparent material, the connection electrode 108 may be formed of a different conductive material which does not allow the input light L1 to be transmitted through. For example, the connection electrode 108 may be formed by depositing ITO on the insulating portion 109 using a mask pattern. For example, the area of the main body portion 108b may be substantially the same as the area of the main body portion 104b of the light input unit 102. In addition, the area of the main body portion 108b may be smaller than the surface area of the transparent electrode 107.

The drive circuit 110 applies an electric field between the transparent electrode 103 and the transparent electrode 107. In the present embodiment, the drive circuit 110 is electrically connected to the connection electrode 104 and the connection electrode 108. The drive circuit 110 applies an electric field between the transparent electrode 103 and the transparent electrode 107 by inputting an electrical signal to the connection electrode 104 and the connection electrode 108. Such a drive circuit 110 is controlled by the control unit 19.

According to the light modulator 100 described above, the input light L1 is transmitted through the transparent electrode 103 of the light input unit 102 and is input to the input surface 101a of the perovskite-type electro-optic crystal 101. This input light L1 is output after being transmitted through the light output unit 106 disposed on the rear surface 101b of the electro-optic crystal 101. In this case, an electric field is applied to a part between the transparent electrode 103 provided in the light input unit 102 and the transparent electrode 107 provided in the light output unit 106. Accordingly, an electric field is applied to the electro-optic crystal 101 having a high relative permittivity, so that the input light L1 can be modulated. In this light modulator 100, the transparent electrode 103 partially covers the input surface 101a. In addition, when the thickness of the electro-optic crystal 101 in the electric field applying direction is d (μm), it is preferable that the area (μm$^2$) of the transparent electrode 103 be 25 d$^2$ or smaller. In addition, the transparent electrode 107 partially covers the rear surface 101b. When the thickness of the electro-optic crystal 101 in the electric field applying direction is d (μm), the area (μm$^2$) of the transparent electrode 107 may be 25 d$^2$ or smaller. In this case, an converse piezoelectric effect or an electrostrictive effect occurs in a portion where the transparent electrode 103 and the transparent electrode 107 are opposed, but no converse piezoelectric effect or no electrostrictive effect occurs around the portion. Therefore, a portion around the part in which the transparent electrode 103 and the transparent electrode 107 face each other functions as a damper. Accordingly, compared to a case in which the input surface 101a and the rear surface 101b are covered with electrodes in their entirety, the converse piezoelectric effect or the electrostrictive effect can be prevented. Therefore, occurrence of resonance or the like is prevented, and stable light modulation is performed.

In addition, since the area of the transparent electrode 103 is formed to be smaller than the area of the transparent electrode 107, positional alignment of the transparent electrode 103 and the transparent electrode 107 can be easily performed.

In addition, the light input unit 102 includes the connection electrode 104 which is electrically connected to the transparent electrode 103, and the insulating portion 105 which blocks an electric field generated in the connection electrode 104. In addition, the drive circuit 110 applies an electric field between the transparent electrode 103 and the transparent electrode 107 with the connection electrode 104 interposed therebetween. In this manner, since the connection electrode 104 is provided for connection to the drive circuit 110, the size, the position, and the like of the transparent electrode 103 can be freely designed. In this case, the insulating portion 105 prevents the electric field which is generated in the connection electrode 104 and affects the electro-optic crystal 101. Similarly, also in the light output unit 106, the size, the position, and the like of the transparent electrode 107 can be freely designed. In addition, it is possible to prevent an electric field which is generated in the connection electrode 108 and affects the electro-optic crystal 101.

In addition, since the configuration includes a temperature control element P which controls the temperature of the electro-optic crystal 101, a uniform temperature for the electro-optic crystal 101 is maintained. Accordingly, the modulation accuracy is more stable. The temperature control element P may perform temperature control with respect to not only the electro-optic crystal 101 but also the entirety of the light modulator 100.

Second Embodiment

A light modulator 200 according to the present embodiment differs from the light modulator 100 of the first embodiment in that a light input unit 202 has a light reducing portion. Hereinafter, differences between the present embodiment and the first embodiment will be mainly described. The same reference signs are applied to the same elements or members, and detailed description thereof will be omitted.

FIG. 4 is a view schematically illustrating the light modulator 200. The light modulator 200 includes the electro-optic crystal 101, the light input unit 202, the light output unit 106, and the drive circuit 110. In FIG. 4(a), the electro-optic crystal 101, the light input unit 202, and the light output unit 106 of the light modulator 200 are illustrated in a cross section. In addition, FIG. 2(b) is a view of the light modulator 200 seen from the light input unit 202 side.

As illustrated in FIG. 4, the light input unit 202 includes the transparent electrode 103, the connection electrode 104, the insulating portion 105, and a light reducing layer 205. The light reducing layer 205 is formed on a surface excluding a part in which the transparent electrode 103 and the insulating portion 105 are formed on the input surface 101a. That is, the entire input surface 101a is covered with the transparent electrode 103, the insulating portion 105, and the light reducing layer 205. The light reducing layer 205 prevents the input light L1 being transmitted through the inside of the electro-optic crystal 101. For example, the light reducing layer is formed of a material such as a black resist obtained by dispersing carbon in an epoxy-based UV cured resin.

In the present embodiment, the insulating portion 105 is formed of a material which does not allow the input light L1 to be transmitted through. Examples of such a material include a black resist obtained by dispersing carbon in an epoxy-based UV cured resin. In this manner, the input surface 101a is covered with the light reducing layer 205 and the insulating portion 105 around the transparent electrode 103. The light reducing layer 205 and the insulating portion 105 reduce light input to the input surface 101a from parts other than the transparent electrode 103. That is, the light reducing layer 205 and the insulating portion 105 constitute a light reducing portion 207. Since the configuration includes such a light reducing portion 207, interference of the input light L1 with different light inside the electro-optic crystal 101 is prevented. The light reducing portion 207 may be any one of a reflecting layer formed to be a layer reflecting light, an absorbing layer formed to be a layer absorbing light, and a blocking layer formed to be a layer blocking light. In addition, when the light reducing layer 205 and the insulating portion 105 are formed of the same material, the light reducing layer 205 and the insulating portion 105 may be integrally formed.

Third Embodiment

A light modulator 300 according to the present embodiment differs from the light modulator 100 of the first embodiment in the configuration of a light output unit 306. Hereinafter, differences between the present embodiment and the first embodiment will be mainly described. The same reference signs are applied to the same elements or members, and detailed description thereof will be omitted.

Figure 5:
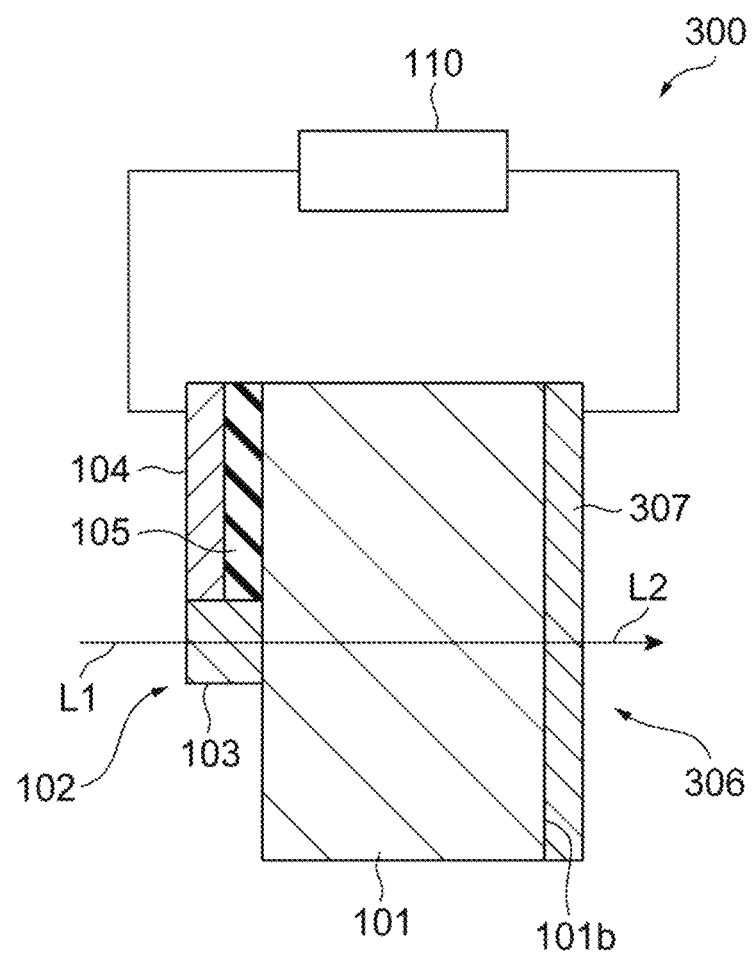
FIG. 5 is a view schematically illustrating a light modulator according to a third embodiment.

FIG. 5 is a view schematically illustrating the light modulator 300. The light modulator 300 includes the electro-optic crystal 101, the light input unit 102, the light output unit 306, and the drive circuit 110. In FIG. 5, the electro-optic crystal 101, the light input unit 102, and the light output unit 306 of the light modulator 300 are illustrated in a cross section.

The light output unit 306 includes a transparent electrode (second electrode) 307. The transparent electrode 307 is disposed on the rear surface 101b of the electro-optic crystal 101. Similar to the transparent electrode 103, for example, the transparent electrode 307 is formed of ITO and allows the input light L1 to be transmitted through. That is, the input light L1 which has been input to the inside of the electro-optic crystal 101 and has been subjected to phase modulation or retardation modulation can be output from the transparent electrode 307 as the modulated light L2. In the present embodiment, the transparent electrode 307 is formed over the entire rear surface 101b.

The drive circuit 110 is electrically connected to the connection electrode 104 and the transparent electrode 307 and applies an electric field between the transparent electrode 103 and the transparent electrode 307.

Fourth Embodiment

A light modulator 400 according to the present embodiment differs from the light modulator 300 of the third embodiment in having the light input unit 202 in place of the light input unit 102. Hereinafter, differences between the present embodiment and the third embodiment will be mainly described. The same reference signs are applied to the same elements or members, and detailed description thereof will be omitted.

Figure 6:
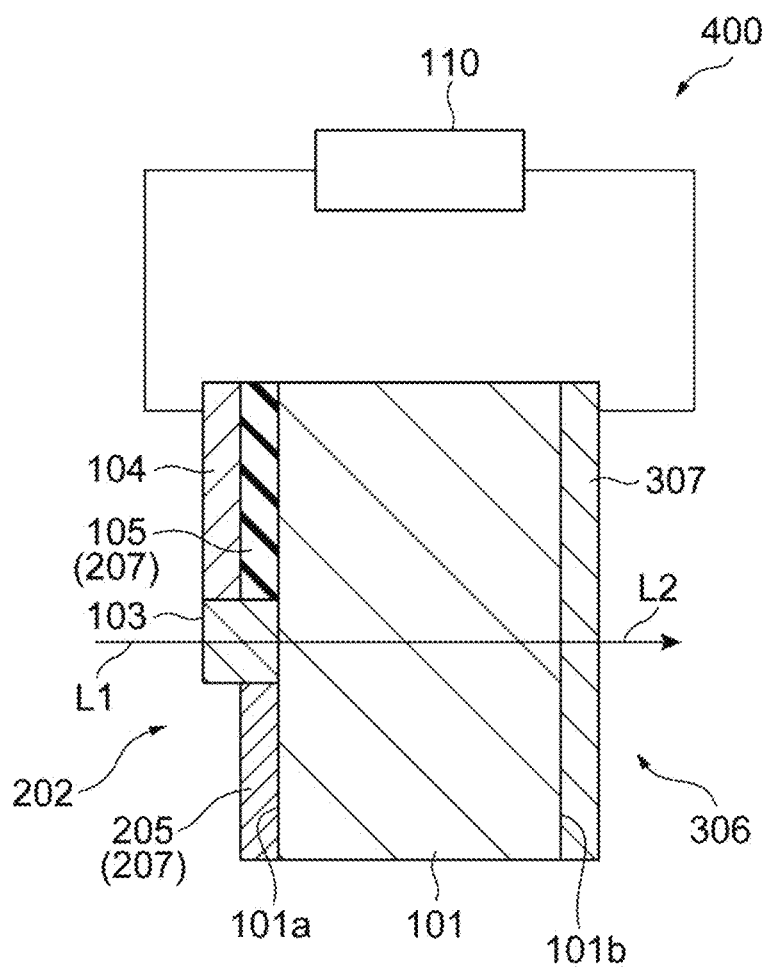
FIG. 6 is a view schematically illustrating a light modulator according to a fourth embodiment.

FIG. 6 is a view schematically illustrating the light modulator 400. The light modulator 400 includes the electro-optic crystal 101, the light input unit 202, the light output unit 306, and the drive circuit 110. In FIG. 6, the electro-optic crystal 101, the light input unit 202, and the light output unit 306 of the light modulator 400 are illustrated in a cross section.

As illustrated in FIG. 6, the light input unit 202 includes the transparent electrode 103, the connection electrode 104, the insulating portion 105, and the light reducing layer 205. Similar to the second embodiment, the light reducing layer 205 and the insulating portion 105 constitute the light reducing portion 207. Accordingly, the input light L1 input to the input surface 101a from parts other than the transparent electrode 103 can be prevented. The light reducing portion 207 may be any one of a reflecting layer formed to be a layer reflecting light, an absorbing layer formed to be a layer absorbing light, and a blocking layer formed to be a layer blocking light. In addition, when the light reducing layer 205 and the insulating portion 105 are formed of the same material, the light reducing layer 205 and the insulating portion 105 may be integrally formed. In addition, the drive circuit 110 is electrically connected to the connection electrode 104 and the transparent electrode 307 and applies an electric field between the transparent electrode 103 and the transparent electrode 307.

Fifth Embodiment

A light modulator 500 according to the present embodiment differs from the light modulator 100 of the first embodiment in the shape of an electro-optic crystal 501. Hereinafter, differences between the present embodiment and the first embodiment will be mainly described. The same reference signs are applied to the same elements or members, and detailed description thereof will be omitted.

Figure 7:
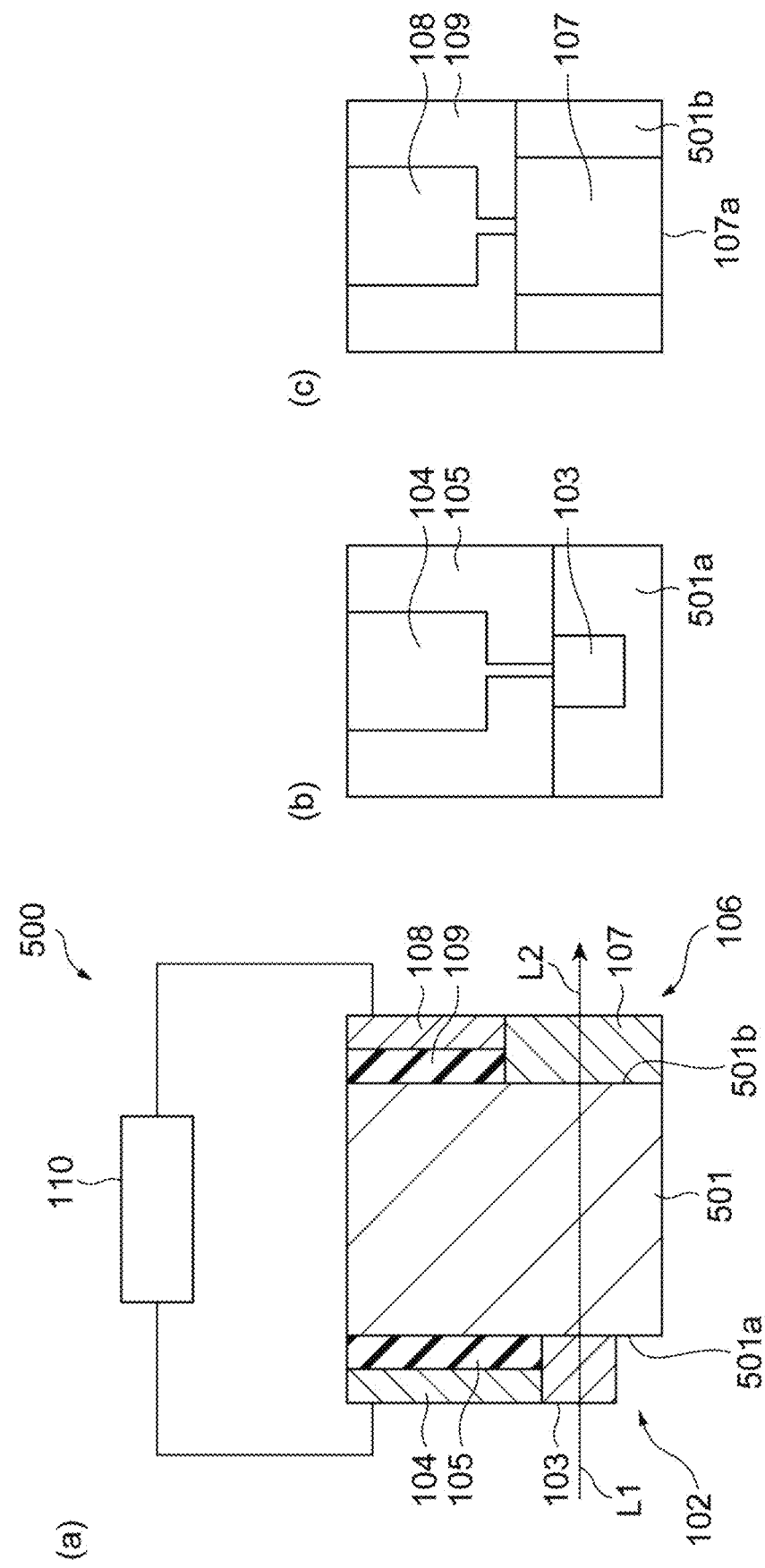
FIG. 7 is a view schematically illustrating a light modulator according to a fifth embodiment.

FIG. 7 is a view schematically illustrating the light modulator 500. The light modulator 500 includes the electro-optic crystal 501, the light input unit 102, the light output unit 106, and the drive circuit 110. In FIG. 7(a), the electro-optic crystal 501, the light input unit 102, and the light output unit 106 of the light modulator 500 are illustrated in a cross section. In addition, FIG. 7(b) is a view of the light modulator 500 seen from the light input unit 102 side, and FIG. 7(c) is a view of the light modulator 500 seen from the light output unit 106 side.

As illustrated in FIG. 7, the electro-optic crystal 501 has a plate shape including an input surface (first surface) 501a to which the input light L1 is input, and a rear surface (second surface) 501b which faces the input surface 501a. The electro-optic crystal 501 is constituted of the same material as that of the electro-optic crystal 101 of the first embodiment (for example, a KTN crystal).

In the present embodiment, the shapes of the light input unit 102 and the light output unit 106 are the same as the shapes thereof in the first embodiment. In contrast, the electro-optic crystal 501 has a compact shape compared to the electro-optic crystal 101 of the first embodiment. Accordingly, the transparent electrode 103 and the transparent electrode 107 are disposed to be deviated to one side (lower side in FIGS. 7(b) and 7(c)) from the centers of the input surface 101a and the rear surface 101b, respectively. In the example of the diagrams, the peripheral edge of the transparent electrode 103 is separated from the peripheral edge of the input surface 501a. On the other hand, one side 107a of the transparent electrode 107 having a rectangular shape coincides with the peripheral edge on the rear surface 101b.

Sixth Embodiment

A light modulator 600 according to the present embodiment differs from the light modulator 100 of the first embodiment in the configuration of a light input unit 602 and a light output unit 606. Hereinafter, differences between the present embodiment and the first embodiment will be mainly described. The same reference signs are applied to the same elements or members, and detailed description thereof will be omitted.

Figure 8:
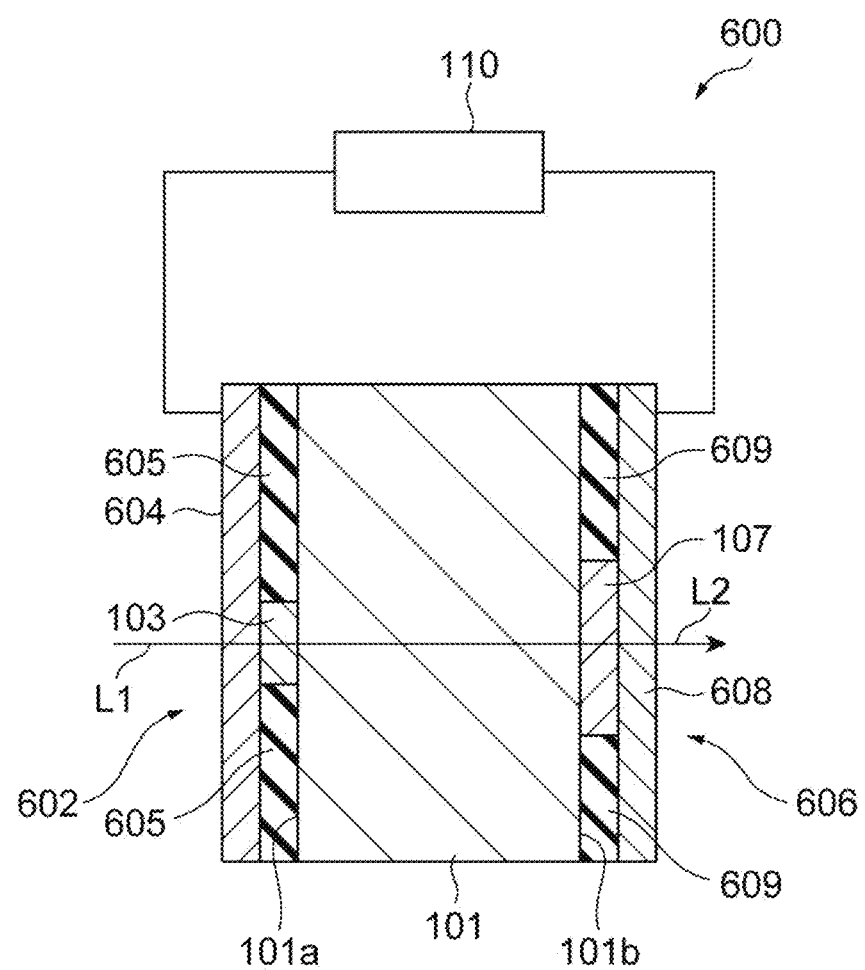
FIG. 8 is a view schematically illustrating a light modulator according to a sixth embodiment.

FIG. 8 is a view schematically illustrating the light modulator 600. The light modulator 600 includes the electro-optic crystal 101, the light input unit 602, the light output unit 606, and the drive circuit 110. In FIG. 8, the electro-optic crystal 101, the light input unit 602, and the light output unit 606 of the light modulator 600 are illustrated in a cross section.

As illustrated in FIG. 8, the light input unit 602 includes the transparent electrode 103, an insulating portion 605, and a transparent connecting electrode 604. The insulating portion 605 is formed over the entire input surface 101a excluding a position at which the transparent electrode 103 is formed. For example, the insulating portion 605 is an insulating film formed of an insulator such as $SiO_2$ or $HfO_2$. In addition, the insulating portion 605 may further have properties of not allowing the input light L1 to be transmitted through. In this case, the insulating portion 605 functions as a light reducing portion. In the present embodiment, the height of the insulating portion 605 is formed to be substantially the same as the height of the transparent electrode 103.

The transparent connecting electrode 604 is formed over the entire surfaces of the transparent electrode 103 and the insulating portion 605. Accordingly, the transparent connecting electrode 604 is electrically connected to the transparent electrode 103. The input light L1 is input from the transparent connecting electrode 604 side to the transparent electrode 103. Therefore, the transparent connecting electrode 604 is formed of a material allowing the input light L1 to be transmitted through. For example, similar to the transparent electrode 103, the transparent connecting electrode 604 may be formed of ITO.

The light output unit 606 includes the transparent electrode 107, an insulating portion 609 and a transparent connecting electrode 608. The insulating portion 609 is formed over the entire rear surface 101b excluding a position at which the transparent electrode 107 is formed. For example, the insulating portion 609 is an insulating film formed of an insulator such as $SiO_2$ or $HfO_2$. In addition, the insulating portion 609 may further have properties of not allowing the input light L1 to be transmitted through. In this case, the insulating portion 609 can function as a light reducing portion. In the present embodiment, the height of the insulating portion 609 is formed to be substantially the same as the height of the transparent electrode 107.

The transparent connecting electrode 608 is formed over the entire surfaces of the transparent electrode 107 and the insulating portion 609. Accordingly, the transparent connecting electrode 608 is electrically connected to the transparent electrode 107. The modulated light L2 is output from the transparent electrode 107 with the transparent connecting electrode 608 interposed therebetween. Therefore, the transparent connecting electrode 608 is formed of a material allowing the modulated light L2 to be transmitted through. For example, similar to the transparent electrode 107, the transparent connecting electrode 608 may be formed of ITO.

The drive circuit 110 is electrically connected to the transparent connecting electrode 604 and the transparent connecting electrode 608 and applies an electric field between the transparent electrode 103 and the transparent electrode 107.

Seventh Embodiment

A light modulator 700 according to the present embodiment differs from the light modulator 600 of the sixth embodiment in that the electro-optic crystal 101 is supported by a transparent substrate 713. Hereinafter, differences between the present embodiment and the seventh embodiment will be mainly described. The same reference signs are applied to the same elements or members, and detailed description thereof will be omitted.

Figure 9:
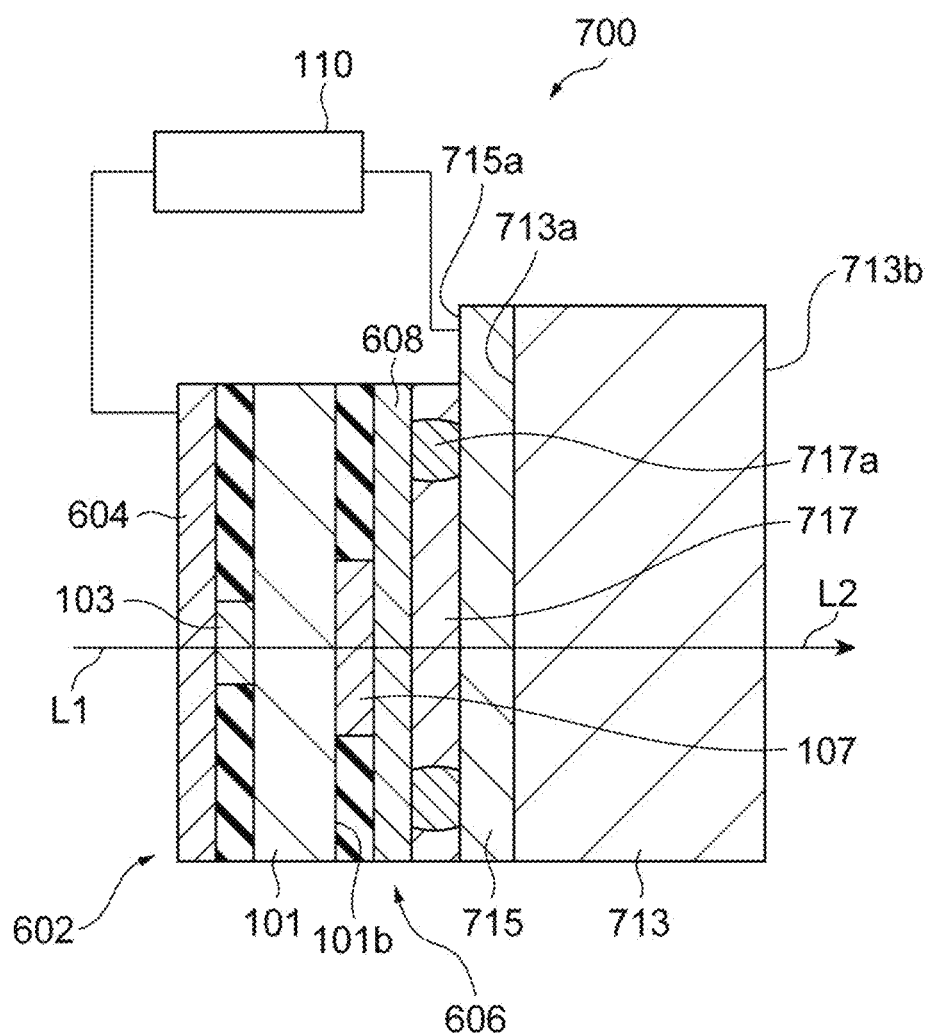
FIG. 9 is a view schematically illustrating a light modulator according to a seventh embodiment.

FIG. 9 is a view schematically illustrating the light modulator 700. The light modulator 700 includes the electro-optic crystal 101, the light input unit 602, the light output unit 606, and the drive circuit 110. In FIG. 9, the electro-optic crystal 101, the light input unit 602, and the light output unit 606 of the light modulator 700 are illustrated in a cross section. In the present embodiment, the thickness of the electro-optic crystal 101 in the optical axis direction may be 50 µm or smaller, for example.

The rear surface 101b side of the electro-optic crystal 101 is supported by the transparent substrate 713 through which the modulated light L2 is transmitted. For example, the transparent substrate 713 is formed of a material such as glass, quartz, or plastic in a flat plate shape. The transparent substrate 713 has an output surface (second surface) 713b which outputs the modulated light L2, and an input surface (first surface) 713a which is a surface on the opposite side of the output surface 713b and faces the light output unit 606 formed in the electro-optic crystal 101. For example, a transparent electrode 715 formed of ITO is formed on the input surface 713a of the transparent substrate 713. The transparent electrode 715 is formed over the entire input surface 713a. The transparent electrode 715 may be formed by depositing ITO on the input surface 713a of the transparent substrate 713.

The transparent connecting electrode 608 formed in the electro-optic crystal 101, and the transparent electrode 715 formed in the transparent substrate 713 adhere to each other by a transparent adhesion layer 717. For example, the transparent adhesion layer 717 is formed of an epoxy-based adhesive and allows the modulated light L2 to be transmitted. For example, a metal sphere-like conductive member 717a is disposed inside the transparent adhesion layer 717. The conductive member 717a is in contact with both the transparent connecting electrode 608 and the transparent electrode 715 and electrically connects the transparent connecting electrode 608 and the transparent electrode 715 to each other. For example, the conductive member 717a is disposed at four corners of the transparent adhesion layer 717 in a plan view.

In the present embodiment, the size of the transparent substrate 713 on the input surface 713a side in a plan view is formed to be larger than that of the rear surface 101b of the electro-optic crystal 101. Therefore, in a state in which the electro-optic crystal 101 is supported by the transparent substrate 713, a portion of the transparent electrode 715 formed in the transparent substrate 713 becomes an exposed portion 715a exposed to the outside. The drive circuit 110 is electrically connected to the exposed portion 715a and the transparent connecting electrode 604. That is, the drive circuit 110 is electrically connected to the transparent electrode 107 with the transparent electrode 715, the conductive member 717a, and the transparent connecting electrode 608 interposed therebetween and is electrically connected to the transparent electrode 103 with the transparent connecting electrode 604 interposed therebetween. Consequently, the drive circuit 110 can apply an electric field between the transparent electrode 103 and the transparent electrode 107.

In such a light modulator 700, phase modulation or retardation modulation can be more favorably performed by forming the electro-optic crystal 101 having a small thickness in the optical axis direction. When the electro-optic crystal 101 is formed to be thin in this manner, there is concern that the electro-optic crystal 101 may be damaged due to an external shock or the like. In the present embodiment, since the electro-optic crystal 101 is supported by the transparent substrate 713, the electro-optic crystal 101 is protected from an external shock or the like.

Eighth Embodiment

A light modulator 800 according to the present embodiment differs from the light modulator 100 of the first embodiment in being a reflective light modulator. When a reflective light modulator is used, it is possible to use an optical element such as a beam splitter which guides the input light L1 to the light modulator and guides the modulated light L2 modulated by the light modulator to the first optical system 14. Hereinafter, differences between the present embodiment and the first embodiment will be mainly described. The same reference signs are applied to the same elements or members, and detailed description thereof will be omitted.

Figure 10:
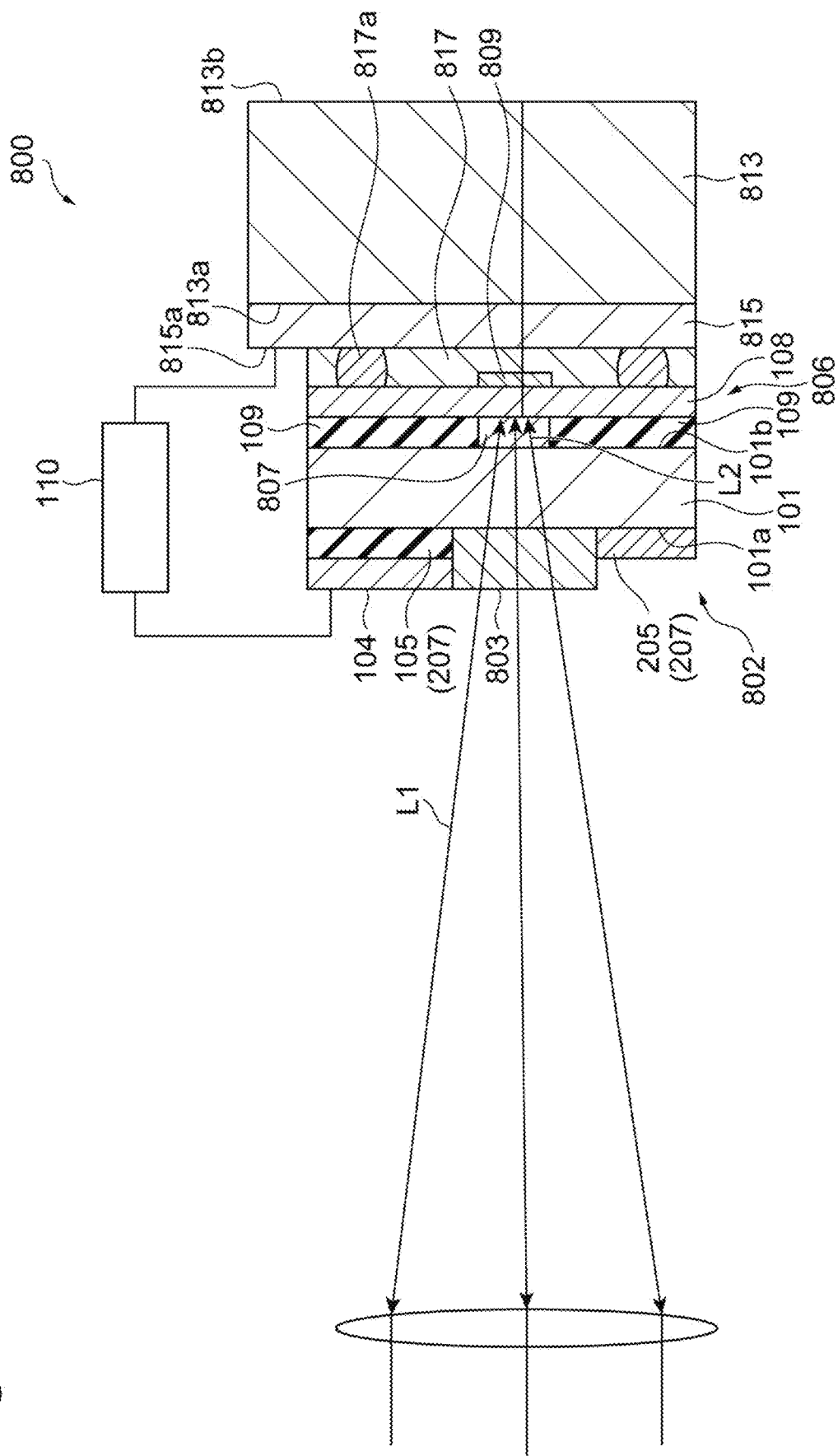
FIG. 10 is a view schematically illustrating a light modulator according to an eighth embodiment.

FIG. 10 is a view schematically illustrating the light modulator 800. The light modulator 800 is a reflective light modulator which modulates the input light L1 and outputs the modulated light L2 that has been subjected to modulation. As illustrated in FIG. 10, the light modulator 800 includes the electro-optic crystal 101, a light input and output unit (first optical element) 802, a light reflecting unit (second optical element) 806, and the drive circuit 110. In FIG. 10, the electro-optic crystal 101, the light input and output unit 802, and the light reflecting unit 806 of the light modulator 800 are illustrated in a cross section. In the present embodiment, the thickness of the electro-optic crystal 101 in the optical axis direction may be 50 µm or smaller, for example.

The rear surface 101b side of the electro-optic crystal 101 is supported by a substrate 813. The substrate 813 is formed in a flat plate shape. The substrate 813 has a first surface 813a which faces the light reflecting unit 806 formed in the electro-optic crystal 101, and a second surface 813b which is a surface on the opposite side of the first surface 813a. An electrode 815 is formed on the first surface 813a of the substrate 813. The electrode 815 is formed over the entire first surface 813a.

The light input and output unit 802 includes a transparent electrode (first electrode) 803, the connection electrode (third electrode) 104, the insulating portion 105, and the light reducing layer 205. The transparent electrode 803 is disposed on the input surface 101a of the electro-optic crystal 101. For example, the transparent electrode 803 is formed of ITO and allows the input light L1 to be transmitted through. That is, the input light L1 is transmitted through the transparent electrode 803 and is input to the inside of the electro-optic crystal 101. In the present embodiment, the transparent electrode 803 is formed in a location at the center on the input surface 101a and partially covers the input surface 101a. When the thickness of the electro-optic crystal 101 in the electric field applying direction is d (µm), the area (µm$^2$) of the transparent electrode 803 may be 25 d$^2$ or smaller. For example, the transparent electrode 803 has a rectangular shape in a plan view. That is, the transparent electrode 803 is separated from the peripheral edge of the input surface 101a. For example, such a transparent electrode 803 may be formed by depositing ITO on the input surface 101a of the electro-optic crystal 101 using a mask pattern.

The light reflecting unit 806 includes a transparent electrode (second electrode) 807, the connection electrode (fourth electrode) 108, the insulating portion 109, and a dielectric multilayer 809. The transparent electrode 807 is disposed on the rear surface 101b of the electro-optic crystal 101. In the present embodiment, the transparent electrode 807 is formed in a location at the center on the rear surface 101b and partially covers the rear surface 101b. When the thickness of the electro-optic crystal 101 in the electric field applying direction is d (unit: µm), the area (µm$^2$) of the transparent electrode 807 may be 25 d$^2$ or smaller. For example, the transparent electrode 807 has a rectangular shape in a plan view. That is, the transparent electrode 807 is separated from the peripheral edge on the rear surface 101b. Similar to the transparent electrode 803, for example, the transparent electrode 807 is formed of ITO and allows the input light L1 to be transmitted through. That is, the input light L1 which has been input to the inside of the electro-optic crystal 101 and has been subjected to phase modulation or retardation modulation can be transmitted through the transparent electrode 807 as the modulated light L2. In the present embodiment, the dielectric multilayer 809 which can efficiently reflect light is provided on a surface of the connection electrode 108 provided in the transparent electrode 807. In this case, the connection electrode 108 is a transparent electrode. The connection electrode 108 and the dielectric multilayer 809 reflect the modulated light L2, which has been transmitted through the transparent electrode 807, toward the transparent electrode 803 formed on the input surface 101a. For example, the dielectric multilayer 809 may be formed by depositing a material such as a substance having a high refractive index (Ta$_2$O$_5$) or a substance having a low refractive index (SiO$_2$) on a surface of the transparent electrode 807. In addition, the connection electrode 108 may serve as a reflecting electrode reflecting the modulated light L2. In this case, the dielectric multilayer 809 is not necessary.

The connection electrode 108 formed in the electro-optic crystal 101 and the electrode 815 formed in the substrate 813 adhere to each other by an adhesion layer 817. For example, the adhesion layer 817 is formed of an epoxy-based adhesive. For example, a metal sphere-like conductive member 817a is disposed inside the adhesion layer 817. The conductive member 817a is in contact with both the connection electrode 108 and the electrode 815 and electrically connects the connection electrode 108 and the electrode 815 to each other. For example, the conductive member 817a is disposed at four corners of the adhesion layer 817 in a plan view. In addition, the electrode 815 has an exposed portion 815a of which a portion is exposed to the outside. The drive circuit 110 is electrically connected to the exposed portion 815a and the connection electrode 104.

In addition, when seen in the optical axis direction, the area of the transparent electrode 807 is formed to be smaller than that of the transparent electrode 803. Then, the center of the transparent electrode 807 and the center of the transparent electrode 803 substantially coincide with each other in the optical axis direction. In this case, for example, even when the input light L is inclined with respect to a reflecting surface of the dielectric multilayer 809, the reflect modulated light L2 easily passes through the transparent electrode 803. In addition, as illustrated in FIG. 10, even when a beam waist is aligned on the reflecting surface of the dielectric multilayer 809, the input light L1 and the modulated light L2 easily pass through the transparent electrode 803. In addition, in the present embodiment, since the electro-optic crystal 101 is supported by the substrate 813, the electro-optic crystal 101 is protected from an external shock or the like, similar to the seventh embodiment.

Ninth Embodiment

A light modulator 900 according to the present embodiment differs from the light modulator 100 of the first embodiment in having a light output unit 906 in place of the light output unit 106. Hereinafter, differences between the present embodiment and the first embodiment will be mainly described. The same reference signs are applied to the same elements or members, and detailed description thereof will be omitted.

Figure 11:
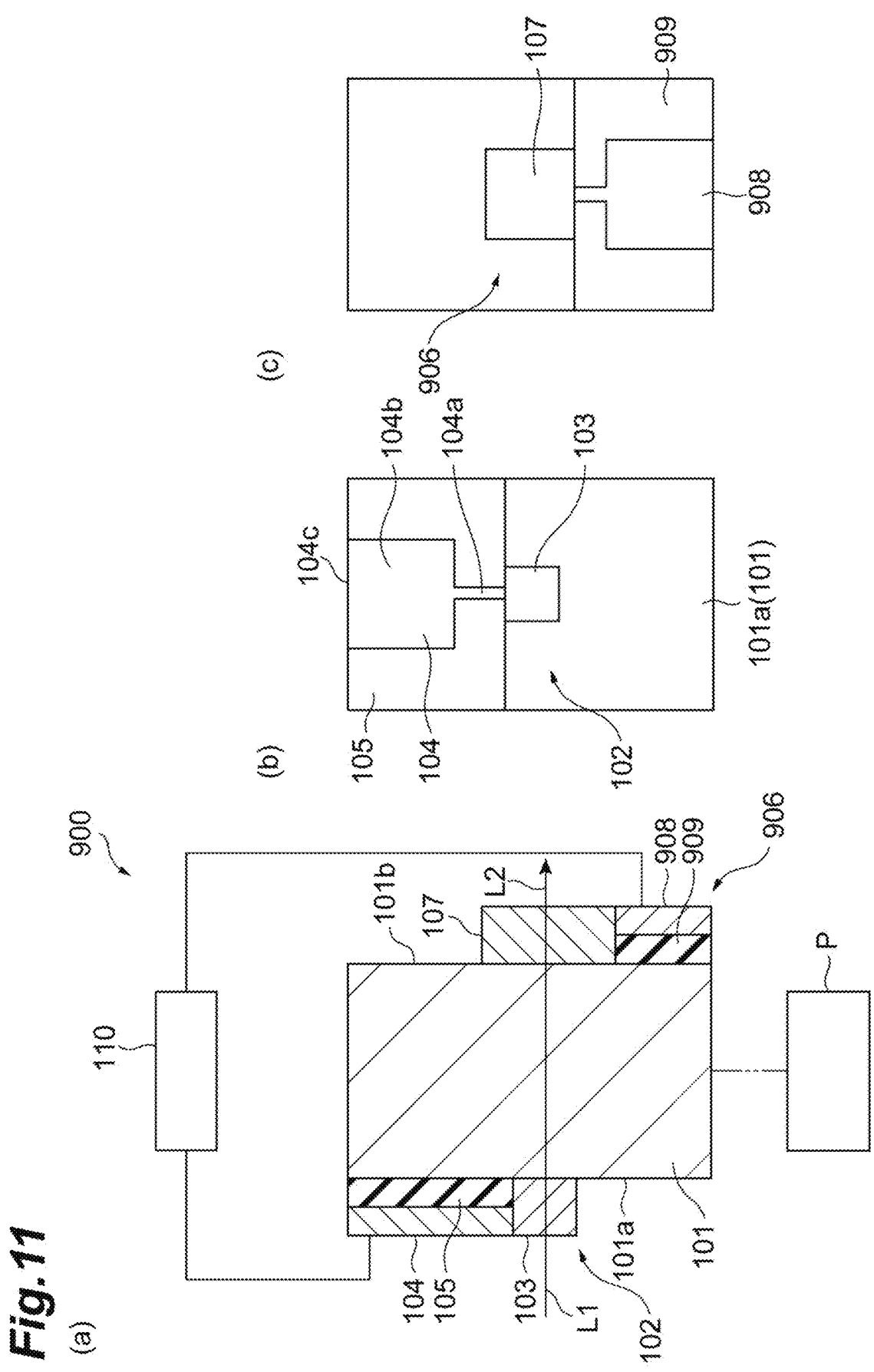
FIG. 11 is a view schematically illustrating a light modulator according to a ninth embodiment.

FIG. 11 is a view schematically illustrating the light modulator 900. The light modulator 900 includes the electro-optic crystal 101, the light input unit 102, the light output unit 906, and the drive circuit 110. In FIG. 11(a), the electro-optic crystal 101, the light input unit 102, and the light output unit 906 of the light modulator 900 are illustrated in a cross section. In addition, FIG. 11(b) is a view of the light modulator 900 seen from the light input unit 102 side, and FIG. 11(c) is a view of the light modulator 900 seen from the light output unit 906 side.

The light output unit 906 includes the transparent electrode 107, a connection electrode 908, and an insulating portion 909. Similar to the connection electrode 108 of the first embodiment, the connection electrode 908 is connected to the transparent electrode 107 and the drive circuit 110. Similar to the insulating portion 109 of the first embodiment, the insulating portion 909 is disposed between the rear surface 101b and the connection electrode 908. The connection electrode 908 is disposed in a direction opposite to the connection electrode 104 of the light input unit 102. Similarly, the insulating portion 909 of the light output unit 906 is also disposed in a direction opposite to the insulating portion 105 of the light input unit 102. That is, the positions on the input surface 101a for disposing the connection electrode 104 and the insulating portion 105 and the positions on the rear surface 101b for disposing the connection electrode 908 and the insulating portion 909 are in directions opposite to each other with respect to the transparent electrode 103 and the transparent electrode 107. Therefore, the connection electrode 104 and the insulating portion 105, and the connection electrode 908 and the insulating portion 909 are deviated from each other when seen in a direction along an optical axis and are disposed not to overlap each other with the electro-optic crystal 101 interposed therebetween. According to such a light modulator 900, the effect of the insulating portion can be further enhanced. The insulating portions 105 and 909 are not necessarily provided.

Similar to the first embodiment, even in the second embodiment to the ninth embodiment described above, occurrence of resonance or the like is prevented, and stable light modulation can be performed.

Hereinabove, the embodiments have been described in detail with reference to the drawings. However, the specific configurations are not limited to these embodiments.

Figure 12:
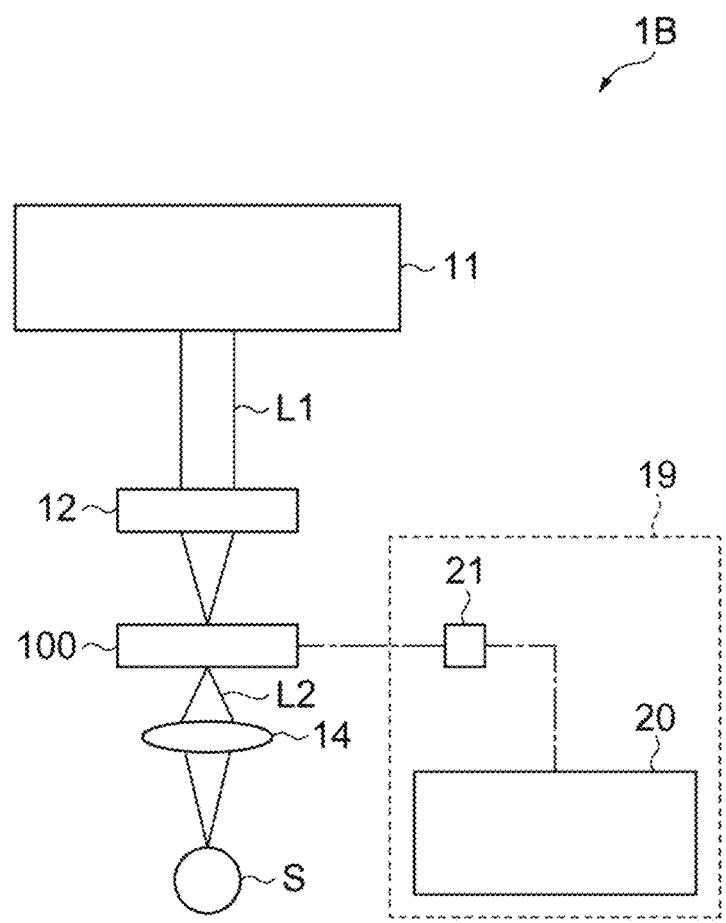
FIG. 12 is a block diagram illustrating a configuration of another optical irradiation device according to the embodiment.

For example, the above embodiments have illustrated an example of the optical observation device 1A including a light modulator. However, the embodiments are not limited thereto. For example, the light modulator 100 may be mounted in an optical irradiation device 1B. FIG. 12 is a block diagram illustrating a configuration of an optical irradiation device. The optical irradiation device 1B has the light source 11, the condensing lens 12, the light modulator 100, the first optical system 14, and a control unit that includes the computer 20 and the controller 21. In this configuration, the first optical system 14 irradiates the specimen S with the modulated light L2 output from the light modulator 100.

The first embodiment to the seventh embodiment and the ninth embodiment have illustrated an example of use in which the input light L1 is input through a light input unit and the modulated light L2 is output through a light output unit. However, the embodiments are not limited thereto. For example, the input light L1 may be input through a light output unit of the light modulator, and the modulated light L2 may be output through a light input unit. In such a method of use, for example, the transparent electrode 103 corresponds to the second electrode, and the transparent electrode 107 having an area larger than the second electrode corresponds to the first electrode. In addition, in this case, for example, in the light modulator 200, a light reducing portion may be formed in the light output unit 106 that is a side to which the input light L1 is input.

In addition, the eighth embodiment has illustrated an example of a configuration in which light is reflected by the dielectric multilayer 809 formed on a surface of the transparent electrode 807. However, the embodiment is not limited thereto. For example, an electrode which can reflect light may be employed in place of the transparent electrode 807 such that input light is reflected by the electrode. For example, input light may be reflected by an electrode formed of aluminum. According to such a configuration, there is no need to separately provide a reflecting layer or the like on the second electrode side.

In addition, the configurations in the embodiments described above may be partially combined or may be replaced with each other. For example, in the second embodiment to the eighth embodiment, similar to the electro-optic crystal 101 in the first embodiment, the electro-optic crystal and the like may be subjected to temperature control by the temperature control element P.

REFERENCE SIGNS LIST

1A Optical observation device
1B Optical irradiation device
100 Light modulator
101 Electro-optic crystal
101a Input surface (first surface)
101b Rear surface (second surface)
102 Light input portion (first optical element)
103 Transparent electrode (first electrode)
104 Connection electrode (third electrode)
105 Insulating portion
106 Light output portion (second optical element)

107 Transparent electrode (second electrode)
110 Drive circuit
207 Light reducing portion
809 Dielectric multilayer
L1 Input light
L2 Modulated light
P Temperature control element

The invention claimed is:

1. A light modulator for modulating input light and outputting modulated light that has been subjected to modulation, the light modulator comprising:
   a perovskite-type electro-optic crystal having a relative permittivity of 1,000 or higher and including a first surface to which the input light is input and a second surface which faces the first surface;
   a first optical element including a first electrode which is disposed on the first surface of the electro-optic crystal and through which the input light is transmitted;
   a second optical element including a second electrode which is disposed on the second surface of the electro-optic crystal and through which the input light is transmitted; and
   a drive circuit configured to apply an electric field between the first electrode and the second electrode,
   wherein the first electrode is disposed alone on the first surface,
   wherein the second electrode is disposed alone on the second surface,
   wherein at least one of the first electrode and the second electrode partially covers the first surface or the second surface,
   wherein a propagation direction of the input light and an applying direction of the electric field are parallel to each other in the electro-optic crystal, and
   wherein the first surface is located along a crystal axis as a rotation center in three crystal axes of the electro-optic crystal and one axis between axes obtained by rotating only two remaining crystal axes about the rotation center at an angle from between 40 degrees and 50 degrees.

2. The light modulator according to claim 1, further comprising:
   a transparent substrate including a first surface which faces the second optical element and a second surface which is a surface on an opposite side of the first surface,
   wherein the transparent substrate is configured to output the input light transmitted through the second optical element.

3. A light modulator for modulating input light and outputting modulated light that has been subjected to modulation, the light modulator comprising:
   a perovskite-type electro-optic crystal having a relative permittivity of 1,000 or higher and including a first surface to which the input light is input and a second surface which faces the first surface;
   a first optical element including a first electrode which is disposed on the first surface of the electro-optic crystal and through which the input light is transmitted;
   a second optical element including a second electrode which is disposed on the second surface of the electro-optic crystal and reflects the input light toward the first surface; and
   a drive circuit configured to apply an electric field between the first electrode and the second electrode,
   wherein the first electrode is disposed alone on the first surface,
   wherein the second electrode is disposed alone on the second surface,
   wherein at least one of the first electrode and the second electrode partially covers the first surface or the second surface,
   wherein a propagation direction of the input light and an applying direction of the electric field are parallel to each other in the electro-optic crystal, and
   wherein the first surface is located along a crystal axis as a rotation center in three crystal axes of the electro-optic crystal and one axis between axes obtained by rotating only two remaining crystal axes about the rotation center at an angle from between 40 degrees and 50 degrees.

4. The light modulator according to claim 3, further comprising:
   a substrate including a first surface which faces the second optical element.

5. The light modulator according to claim 1,
   wherein when a thickness (μm) of the electro-optic crystal in an electric field applying direction of the electro-optic crystal is d, an area (μm$^2$) of at least one of the first electrode and the second electrode is $25d^2$ or smaller.

6. The light modulator according to claim 1,
   wherein the area of the first electrode is larger or smaller than the area of the second electrode.

7. The light modulator according to claim 1, further comprising:
   a third electrode electrically connected to the first electrode; and
   a fourth electrode electrically connected to the second electrode,
   wherein the third electrode and the fourth electrode are disposed not to overlap each other with the electro-optic crystal interposed therebetween.

8. The light modulator according to claim 1,
   wherein the first optical element includes
   a third electrode electrically connected to the first electrode, and
   an insulating portion which disposed between the third electrode and the first surface and blocks an electric field generated in the third electrode, and
   wherein the drive circuit is configured to apply an electric field to the first electrode with the third electrode interposed therebetween.

9. The light modulator according to claim 1,
   wherein the first optical element has a light reducing portion which covers the first surface around the first electrode and is configured to reduce light input to the first surface from a portion around the first electrode.

10. The light modulator according to claim 9,
    wherein the light reducing portion is a reflecting layer which reflects the light.

11. The light modulator according to claim 9,
    wherein the light reducing portion is an absorbing layer which absorbs the light.

12. The light modulator according to claim 9,
    wherein the light reducing portion is a blocking layer which blocks the light.

13. The light modulator according to claim 3,
    wherein a dielectric multilayer reflecting the input light is provided in the second electrode.

14. The light modulator according to claim 3,
    wherein the second electrode is configured to reflect the input light.

15. The light modulator according to claim 1,
wherein the electro-optic crystal is a crystal of $KTa_{1-x}Nb_xO_3$ ($0 \leq x \leq 1$), a crystal of $K_{1-y}Li_yTa_{1-x}Nb_xO_3$ ($0 \leq x \leq 1$ and $0 \leq y \leq 1$), or a PLZT crystal.

16. The light modulator according to claim 1, further comprising:
a temperature control element for controlling a temperature of the electro-optic crystal.

17. An optical observation device comprising:
a light source configured to output the input light;
the light modulator according to claim 1;
an optical system configured to irradiate a target with modulated light output from the light modulator; and
a light detector configured to detect light output from the target.

18. An optical irradiation device comprising:
light source configured to output the input light;
the light modulator according to claim 1; and
an optical system configured to irradiate a target with modulated light output from the light modulator.

19. The light modulator according to claim 3,
wherein when a thickness (μm) of the electro-optic crystal in an electric field applying direction of the electro-optic crystal is d, an area ($\mu m_2$) of at least one of the first electrode and the second electrode is $25d^2$ or smaller.

20. The light modulator according to claim 3,
wherein the area of the first electrode is larger or smaller than the area of the second electrode.

21. The light modulator according to claim 3, further comprising:
a third electrode electrically connected to the first electrode; and
a fourth electrode electrically connected to the second electrode,
wherein the third electrode and the fourth electrode are disposed not to overlap each other with the electro-optic crystal interposed therebetween.

22. The light modulator according to claim 3,
wherein the first optical element includes
a third electrode electrically connected to the first electrode, and
an insulating portion which disposed between the third electrode and the first surface and blocks an electric field generated in the third electrode, and
wherein the drive circuit is configured to apply an electric field to the first electrode with the third electrode interposed therebetween.

23. The light modulator according to claim 3,
wherein the first optical element has a light reducing portion which covers the first surface around the first electrode and is configured to reduce light input to the first surface from a portion around the first electrode.

24. The light modulator according to claim 23,
wherein the light reducing portion is a reflecting layer which reflects the light.

25. The light modulator according to claim 23,
wherein the light reducing portion is an absorbing layer which absorbs the light.

26. The light modulator according to claim 23,
wherein the light reducing portion is a blocking layer which blocks the light.

27. The light modulator according to claim 3,
wherein the electro-optic crystal is a crystal of $KTa_{1-x}Nb_xO_3$ ($0 \leq x \leq 1$), a crystal of $K_{1-y}Li_yTa_{1-x}Nb_xO_3$ ($0 \leq x \leq 1$ and $0 \leq y \leq 1$), or a PLZT crystal.

28. The light modulator according to claim 3, further comprising:
a temperature control element for controlling a temperature of the electro-optic crystal.

29. An optical observation device comprising:
a light source configured to output the input light;
the light modulator according to claim 3;
an optical system configured to irradiate a target with modulated light output from the light modulator; and
a light detector configured to detect light output from the target.

30. An optical irradiation device comprising:
a light source configured to output the input light;
the light modulator according to claim 3; and
an optical system configured to irradiate a target with modulated light output from the light modulator.

* * * * *